(12) United States Patent
Chen et al.

(10) Patent No.: US 6,578,060 B2
(45) Date of Patent: *Jun. 10, 2003

(54) FLOATING-POINT CALCULATION APPARATUS

(75) Inventors: Addison Chen, Hyogo (JP); Hiroaki Suzuki, Hyogo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/275,079

(22) Filed: Mar. 24, 1999

(65) Prior Publication Data

US 2002/0133525 A1 Sep. 19, 2002

(30) Foreign Application Priority Data

Nov. 24, 1998 (JP) ............................................. 10-332629

(51) Int. Cl.[7] .............................. G06F 7/42; G06F 7/00
(52) U.S. Cl. ........................................ 708/505; 708/201
(58) Field of Search ................................. 708/201, 505

(56) References Cited

U.S. PATENT DOCUMENTS

| 3,814,925 | A | * | 6/1974 | Spannagel ................... 708/201 |
| 4,953,115 | A | * | 8/1990 | Kanoh |
| 5,216,628 | A | * | 6/1993 | Mizutani et al. |
| 5,373,459 | A | * | 12/1994 | Taniguchi |
| 5,563,813 | A | * | 10/1996 | Chen et al. |
| 5,610,850 | A | * | 3/1997 | Uratani et al. |
| 5,835,389 | A | * | 11/1998 | Wong |

OTHER PUBLICATIONS

"Leading–Zero Anticipatory Logic for High–Speed Floating Point Addition", by Suzuki, et al., IEEE Journal of Solid–State Circuits, vol. 31, No. 8, Aug. 1996, pp. 1157–1164.

* cited by examiner

Primary Examiner—Tan V. Mai
(74) Attorney, Agent, or Firm—McDermott, Will & Emery

(57) ABSTRACT

A value of difference between exponent values and an inverted value thereof obtained by an inverting circuit are calculated using one subtractor and one of the value of the difference and the inverted value of the difference is selected in accordance with a signal indicating which of the exponent values is greater. Only one subtractor is used, so that the scale of the circuit is reduced and the reduction in chip real estate and power consumption can be achieved. Thus, a circuit for calculating an absolute value of difference between exponent values for right-shifting a floating-point number is provided, with reduced chip real estate and power consumption.

17 Claims, 15 Drawing Sheets

F I G. 1
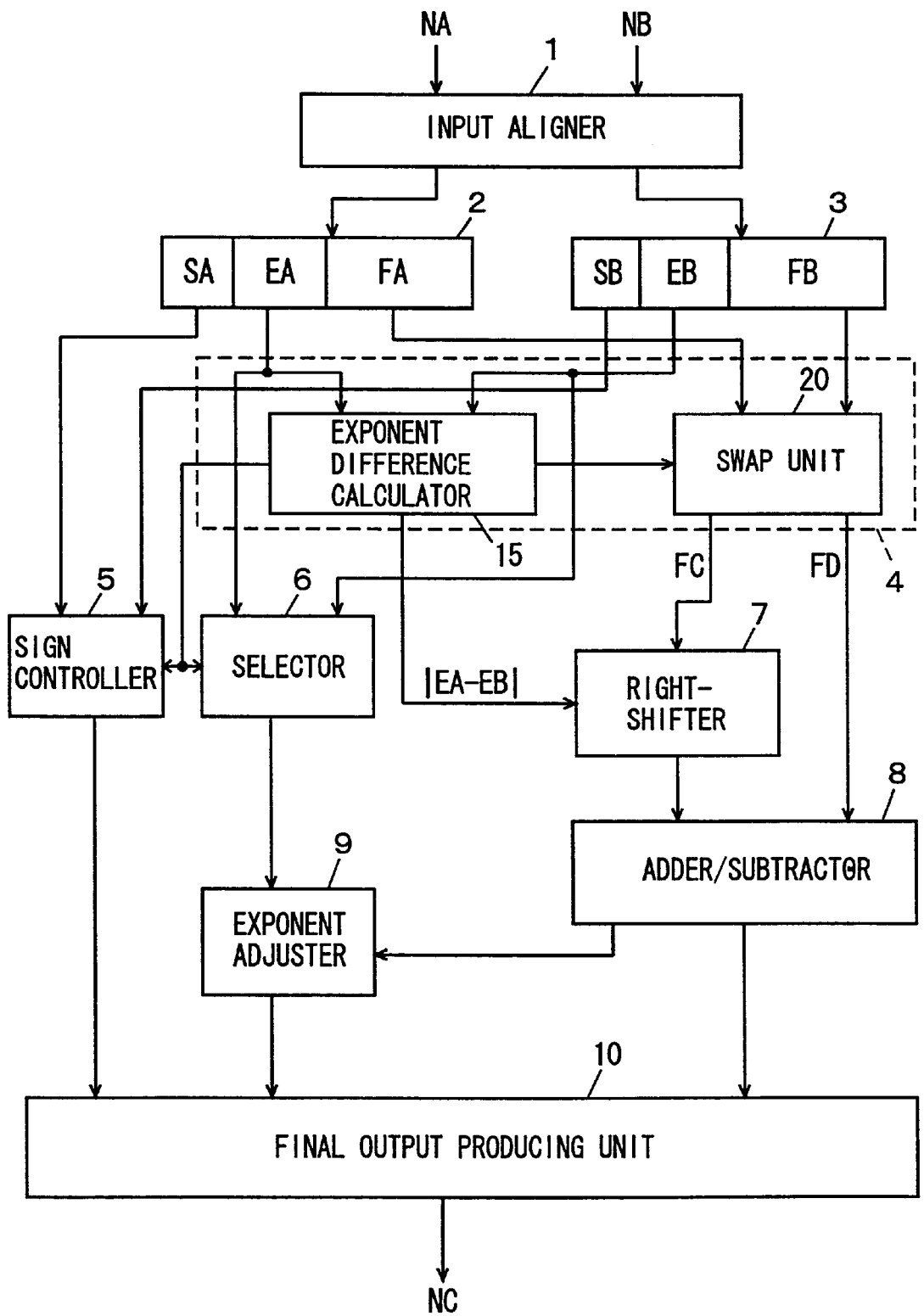

1 BIT RIGHT-SHIFT BY INTERCONNECTION LINES

FLOATING-POINT CALCULATION APPARATUS

BACKGROUND OF THE INVENTION

1. Field of the Invention

The present invention relates to floating-calculation apparatuses and, more particularly to an apparatus for floating-point addition and subtraction using a digital circuit. More specifically, the present invention relates to a structure of a circuit for addition and subtraction of exponent values in order to align fraction parts for floating-point addition and subtraction.

2. Description of the Background Art

FIG. 16 is a diagram showing a structure of a format for floating-point representation. Referring to FIG. 16, a floating-point number has an exponent part storing an exponent value E, a fraction part storing a fraction value (or a mantissa value) F and a sign part storing a sign bit SG representing a sign of the fraction value of the fraction part. The floating-point number is represented by $(-1)^{SG} \cdot (1.F) 2^{E+BIAS}$. Here, "BIAS" represents a bias value for normalization. The fraction and exponent values are generally represented by the hexadecimal system.

Such floating-point number can accommodate a significant number with a large number of digits, and is widely used for scientific calculation or the like.

For addition or subtraction of such floating-point numbers, digits thereof must be aligned as in the case of a usual addition or subtraction of the decimal numbers. Thus, for floating-point addition or subtraction, a fraction part of a smaller floating-point number is right-shifted (logic right-shifted), so that the exponent values of the floating-point numbers, between which addition or subtraction is performed, can be equalized.

Now, digit alignment of two operands NA and NB will be considered with reference to FIG. 17(A). Operand NA is represented in the floating-point representation using the hexadecimal system, and has a sign bit, exponent value and fraction value of 0, "43" and "65123A", respectively. The second operand NB has the sign bit, exponent value and fraction value of "0", "3F" and "CBA987", respectively.

The exponent value "43" of first operand NA is greater than the exponent value "3F" of second operand NB. Thus, in order to make the exponent value "3F" of second operand NB equal to the exponent value "43" of first operand NA, the fraction part of second operand NB is shifted in a right direction and, the exponent value of second operand NB is increased every time the fraction part is shifted.

First, with reference to FIG. 17(B), the fraction value of second operand NB is right-shifted by 1 bit. In the most significant bit position, "0" is inserted. In other words, logic right-shift is performed on the fraction part. As a result of the right-shift by 1 bit, the exponent value of second operand NB is increased by 1 and turns to "40".

Thereafter, as shown in FIG. 17(C), the fraction value of the second operand is further light-shifted by 1 bit, so that the exponent value of the second operand is increased by 1. As the exponent value "41" is still smaller than the exponent value "43" of first operand NA, right-shifting is further performed as shown in FIGS. 17(D) and 17(E). As shown in FIG. 17(E), the exponent value "43" of second operand NA is made equal to the exponent value of first operand NA, and thus digit alignment of the fraction values of first and second operands NA and NB is completed. Subsequently, addition or subtraction of first and second operands NA and NB, respectively shown in FIGS. 17(A) and 17(E), is executed.

Thus, for addition or subtraction of the floating-point numbers, determination must be made as to which of the fraction values of two operands must be right-shifted. To that end, it is necessary to compare the exponent values of two operands, determine the operand (floating-point number) to be right-shifted, and calculate the difference of the exponent values to determine an amount to be right-shifted.

FIG. 18 is a diagram schematically showing a structure of a right-shift amount determination portion in a conventional floating-point calculation apparatus. The structure shown in FIG. 18 is described, for example, in Suzuki et al., "Leading-Zero Anticipatory Logic for High-Speed Floating Point Addition", IEEE Journal of Solid-State Circuits, vol. 31, #8, pp. 1157–1164, August 1996.

In FIG. 18, a shift amount calculation portion calculates a shift amount for two floating-point numbers (operands) NA and NB. Floating-point number NA has an exponent value EA and a fraction value FA, whereas floating-point number NB has an exponent value EB and a fraction value FB.

As shown in FIG. 18, the shift amount calculation portion includes two 2's complement subtractors 701 and 702 arranged in parallel, and a comparator 703 for comparing exponent values EA and EB. 2's complement subtractor 701 has its inputs IA and IB respectively receiving exponent values EA and EB, and subtracts exponent value EB applied to input IB from exponent value EA applied to input IA. Here, 2's complement subtractor 701 converts exponent value EB applied to input IB to a 2's complement for addition, and outputs the addition result from an output O. On the other hand, 2's complement subtractor 702 subtracts exponent value EA applied to input IB from exponent value EB applied to input IA, and outputs a value indicating the subtraction result from output O.

Comparator 703 asserts a signal output from O "1" when exponent value EA applied to an input CA thereof is equal to or greater than exponent value EB applied to an input CB thereof. When exponent value EA applied to input CA is smaller than exponent value EB applied to input CB, the signal from output O is asserted "0" by comparator 703.

The shift amount calculation portion further includes: a multiplexer 704 having its inputs I1 and I0 respectively receiving output values from 2's complement subtractors 701 and 702 for selecting one of the output values in accordance with an output signal from comparator 703 for outputting from output O; a multiplexer 705 having its inputs I0 and I1 respectively receiving fraction values FA and FB of floating-point numbers NA and NB for selecting one of the fraction values in accordance with the output signal from comparator 703 and outputting a fraction value FC; and a multiplexer 706 having its inputs I0 and I1 respectively receiving fraction values FB and FA for selecting one of the fraction values in accordance with the output signal from comparator 703 and outputting a fraction value FD from output O. Digit-shifting is performed for fraction value FC from multiplexer 705 by a right-shift circuit (not shown), whereas fraction value FD from multiplexer 706 is not right-shifted and applied to an adder (not shown).

Two 2's complement subtractors 701 and 702 are used with the following reasons. When a large exponent value is subtracted from a small exponent value, a negative value is produced so that a shift amount cannot be determined correctly. For the determination of the shift amount, an absolute value of the difference must be calculated. The 2's complement subtractors 701 and 702 are used for absolute value subtraction for calculating the absolute value of the difference. In 2's complement subtractors 701 and 702, two exponent values EA and EB are applied in reversed arrangements. Thus, one subtractor produces a positive value, and the other produces a negative value. Comparator 703 determines which of the subtractors outputs the negative value. The absolute value of the difference |EA-EB| between exponent values EA and EB determines a right-shift amount of the fraction value. On the other hand, the output signal from comparator 703 also indicates which of the fraction values must be right-shifted, and multiplexers 705 and 706 select the fraction value to be right-shifted and that not to be right-shifted. Now, the operation will briefly be described.

The 2's complement subtractors 701 and 702 respectively produce values (EA-EB) and (EB-EA). Comparator 703 asserts "1" when exponent value EA is equal to or greater than exponent value EB. If the output signal from comparator 703 is "1", multiplexer 704 selects a value of difference (EA-EB) applied to input I1, and otherwise selects a value of difference (EB-EA) applied to input I0. When the output signal from comparator 703 is asserted "1", exponent value EA is equal to or greater than exponent value EB, and the value of difference (EA-EB) is positive or 0. On the other hand, when the output signal from comparator 703 is "0", the value of difference (EB-EA) is positive. In this case, multiplexer 704 selects the value of difference (EB-EA) applied to input I0. Thus, the absolute value of difference |EA-EB| between exponent values EA and EB is output from multiplexer 704.

Multiplexer 705 selects a numerical value applied to one of its inputs in the same manner as multiplexer 704. More specifically, when the output signal from comparator 703 is asserted "1" and exponent value EA is equal to or greater than exponent value EB, multiplexer 705 selects fraction value FB applied to input I1, and otherwise multiplexer 705 selects fraction value FA applied to input I0. If the output signal from comparator 703 is asserted "1", floating-point number NA is greater than floating-point number NB, and thus fraction value FB must be right-shifted. On the other hand, if NA is not greater than NB, fraction value FA must be right-shifted. Therefore, multiplexer 705 selects fraction value FC of the floating-point number with a smaller exponent value for application to a right-shift circuit (not shown).

On the other hand, multiplexer 706 receives fraction values FA and FB in reversed arrangement with reference to multiplexer 705, and therefore, a fraction value of the floating-point number with a larger exponent value is selected in multiplexer 706. Thus, fraction value FD from multiplexer 706 is not right-shifted.

As the above described two subtractors and the comparator are used, calculation of the right-shift amount and selection of the fraction value to be right-shifted are simultaneously performed. However, provision of two subtractors disadvantageously increases circuit scale and power consumption. In the floating-point representation, generally, a format of exponent and fraction values are standardized as shown in FIG. 16. A floating-point number generally includes an 1-bit sign, 15-bit exponent and 64-bit significand (63-bit fraction). Thus, subtractors 701 and 702 must perform subtraction of 15-bit exponent values, so that the circuit scale thereof extremely increases and power consumption also increases accordingly.

FIG. 19 is a diagram schematically showing another structure of the conventional right-shift amount calculation portion. As shown in FIG. 19, the right-shift amount calculation portion includes: a 2's complement subtractor 801 subtracting exponent value EB from exponent value EA; a 2's complement subtractor 802 subtracting exponent value EA from exponent value EB; and a multiplexer 804 selecting one of output values (EA-EB) and (EB-EA) from 2's complement subtractors 801 and 802 in accordance with a carryout signal Cout from 2's complement subtractor 802. 2's complement subtractor 802 asserts its carryout signal Cout "1" when exponent value EB applied to an input IA thereof is greater than or equal to exponent value EA applied to an input IB thereof. Multiplexer 804 selects a value of difference (EB-EA) applied to input I1 when carryout signal Cout applied to a selection input S thereof is "1" and otherwise selects the value of difference (EA-EB) applied to input I0. Thus, the absolute value of difference |EA-EB| between exponent values EA and EB is output from multiplexer 804.

The right-shift amount calculation portion further includes: a multiplexer 805 having its inputs I1 and I0 respectively receiving fraction values FA and FB for selecting one of the fraction values in accordance with carryout signal Cout applied to a selection input S thereof; and a multiplexer 806 having its inputs I1 and I0 respectively receiving fraction values FB and FA for selecting one of the fraction values in accordance with carryout signal Cout from 2's complement subtractor 802. Although multiplexers 805 and 806 select one of the inputs in the same manner, the fraction values applied to their inputs are reversely arranged. Thus, when carryout signal Cout is "1", multiplexers 805 and 806 respectively select fraction values FA and FB applied to their inputs I1. On the other hand, when carryout signal Cout is "0", multiplexers 805 and 806 respectively select fraction values FB and FA applied to their input I0. Fraction value FC from multiplexer 805 is applied to a right-shift circuit. Multiplexer 805 selects the fraction value of a floating-point number with a smaller value for application to the right-shift circuit, whereas multiplexer 86 selects the fraction value of a floating point number with a larger value and produces a fraction value FD which is not to be right-shifted.

In the structure shown in FIG. 19, the fact that the exponent value is an integer without a sign is utilized. Carryout signal Cout indicates if the produced subtraction result is positive or negative, which is utilized to calculate the absolute value of the difference between the exponent values. However, also in the structure shown in FIG. 19, two subtractors are used, thereby increasing the scale of the circuit as well as power consumption and chip real estate.

SUMMARY OF THE INVENTION

An object of the present invention is to provide a floating-point calculation apparatus capable of reducing chip real estate and power consumption without any decrease in processing speed.

A specific object of the present invention is to provide a floating-point addition and subtraction apparatus capable of performing exponent value subtraction used in floating-point calculation with reduced power consumption and chip real estate.

In short, the present invention includes: a subtractor for subtraction of exponent values; an inverting circuit for inverting an output value from the subtractor; and a circuit for selecting one of the output values from the subtractor and inverting circuit for producing an absolute value of the difference between the exponent values in accordance with a magnitude relation indication signal indicating which exponent value is larger.

More specifically, a floating-point calculation apparatus according to the present invention includes: a subtractor for subtraction of exponent values of first and second operands; an inverting circuit for inverting an output value from the subtractor; and a first selection circuit for selecting one of output values from the subtractor and inverting circuit to produce an absolute value of the difference for right-shifting a fraction value.

Only one subtractor is used for calculating an absolute value of the difference between exponent values, and the inverting circuit only inverts each bit of the output value. The scale of the inverting circuit is sufficiently small as compared with the subtractor, so that reduction in scale of the circuit and power consumption can be achieved. In addition, even when a comparator is used, the scale of the comparator is small as compared with that of the subtractor, so that reduction in chip real estate and power consumption can be achieved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram schematically showing an overall structure of a floating-point calculation apparatus according to the present invention.

DESCRIPTION OF THE PREFERRED EMBODIMENTS

Overall Structure

Figure 2:
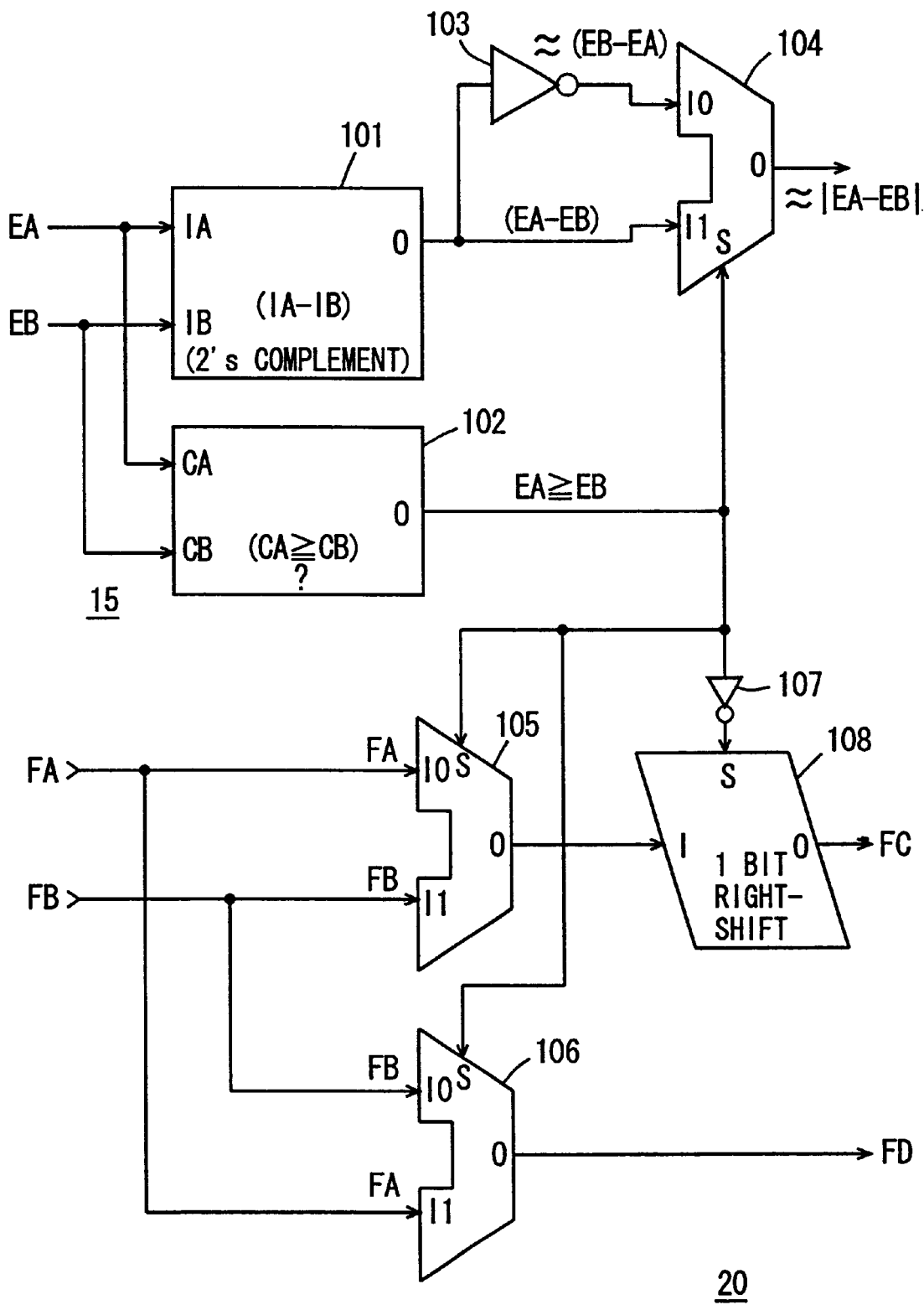
FIG. 2 is a diagram schematically showing a structure of a main portion of the floating-point calculation apparatus according to a first embodiment of the present invention.

FIG. 1 is a diagram schematically showing an overall structure of a floating-point calculation apparatus according to the present invention. Referring to FIG. 1, the floating-point calculation apparatus includes: an input aligner 1 for aligning bit positions of input operands NA and NB; register circuits 2 and 3 respectively storing input operands NA and NB having their bit positions adjusted by the input aligner; a preprocessing stage for right-shifting 4 performing a preprocess for right-shifting of a fraction value in accordance with exponent values EA and EB and fraction values FA and FB stored in register circuits 2 and 3; a sign controller 5 receiving sign bits SG stored in register circuits 2 and 3 for determining a sign in accordance with a control signal from preproccesisng stage for right-shifting 4; a selector 6 selecting a larger one of exponent values EA and EB stored in register circuits 2 and 3; a right-shift unit 7 right-shifting fraction value FC of the smaller one of the input operands; an addition and subtraction circuit 8 performing addition or subtraction of an output signal from right-shift unit 7 and an output fraction value FD from preprocessing stage for right-shifting 4; and exponent adjusting circuit 9 adjusting an exponent value applied from selector 6 in accordance with an output signal from addition and subtraction circuit 8; and a final output producing unit 10 producing and outputting a final output value NC in accordance with an output sign from sign controller 5, an output exponent value from exponent value adjusting circuit 9 and an output value from addition and subtraction circuit 8.

Input aligner 1 aligns input operands NA and NB in accordance with a format of a floating-point representation and stores the resulting operands to register circuits 2 and 3, respectively. Input operands NA and NB are floating-point numbers. A sign bit SA, exponent value EA and fraction value FA (or a significand) of input operand NA are stored in register circuit 2, and a sign bit SB, exponent value EB and fraction value FB (or a significand) of input operand NB are stored in register circuit 3.

Preprocessing stage for right-shifting 4 includes: an exponent difference calculating unit 15 calculating an absolute value of the difference between exponent values in EA and EB stored in register circuits 2 and 3 and producing a control signal indicating which of the exponent values is greater; and a swap unit 20 receiving fraction values FA and FB from register circuits 2 and 3 and routing a fraction value to be right-shifted and a fraction value not to be right-shifted under the control signal from exponent difference calculating unit 15. Fraction values FC and FD, which are respectively to be right-shifted and not to be right-shifted, are output from swap unit 20.

Sign controller 5 determines a sign of the final output value by sign bits SA and SB in accordance with the control signal from exponent difference calculating unit 15. Sign controller 5 determines the sign of the final output value depending on which of input operands NA and NB is greater and if the operation to be executed is addition or subtraction. If the sign cannot be determined in this stage, that is, if exponent values are the same, a final sign is determined by final output producing unit 10.

Selector 6 selects and outputs the larger one of exponent values EA and EB in accordance with the control signal output from exponent difference calculating unit 15.

Right-shift unit 7 performs a right-shift operation on fraction value FC from swap unit 20 in accordance with an absolute value of the difference |EA−EB| between the exponent values output from exponent difference calculating unit 15, and outputs the shift result.

Addition and subtraction circuit 8 performs addition or subtraction of the shift result value from right-shift unit 7 and fraction value FD from swap unit 20. Exponent adjusting circuit 9 adjusts the exponent value applied from selector 6 in accordance with a carryout signal or a borrow signal from addition and subtraction circuit 8.

Final output producing unit 10 receives the sign bit from sign controller 5, the output exponent value from exponent adjusting circuit 9 and an addition or subtraction result from addition and subtraction circuit 8 for performing an operation such as rounding operation, and also performs final adjustment of the sign and exponent values for producing final output value NC.

The present invention is made to improve the structure of preprocessing stage for right-shifting 4 in the floating-point calculation apparatus shown in FIG. 1. Thus, the overall structure of the floating-point calculation apparatus according to the present invention is not limited to the structure shown in FIG. 1. FIG. 1 merely shows the structure of the floating-point calculation apparatus to which preprocessing stage for right-shifting 4 according to the present invention is applied.

First Embodiment

FIG. 2 is a diagram showing a structure of a main portion of a floating-point calculation apparatus according to a first embodiment of the present invention. A structure of a preprocessing stage for right-shifting 4 according to the present invention is shown in FIG. 2. Referring to FIG. 2, an exponent difference calculating unit 15 includes: a 2's complement subtractor 101 subtracting an exponent value EB applied to an input IB from an exponent value EA applied to an input IA; a comparator 102 comparing exponent values EA and EB respectively applied to inputs CA and CB; an inverting circuit 103 inverting all bits of an output value from 2's complement subtractor 101; and a 2:1 multiplexer 104 receiving an output signal from comparator 102 at a selection input S for selecting and outputting one of output values from inverting circuit 103 and 2's complement subtractor 101 which are respectively applied to inputs I0 and I1.

A swap unit 20 includes: 2:1 multiplexer 105 selecting one of fraction values FA and FB respectively applied to inputs I0 and I1 in accordance with an output signal from comparator 102 applied to a selection input S; a 2:1 multiplexer 106 selecting one of fraction values FB and FA respectively applied to inputs I0 and I1 in accordance with an output signal from comparator 102 applied to selection input S; an inverting circuit 107 inverting an output signal from comparator 102; and a compensating right-shift circuit 108 selectively performing logic right-shift by 1 bit on an output value from 2:1 multiplexer 105 in accordance with an output signal from inverting circuit 107 applied to selection input S. An output value FC from compensating right-shift circuit 108 is applied to a right-shift unit 7 shown in FIG. 1, and an output value FD from 2:1 multiplexer 106 is directly applied to addition and subtraction circuit 8 shown in FIG. 1.

Figure 3:
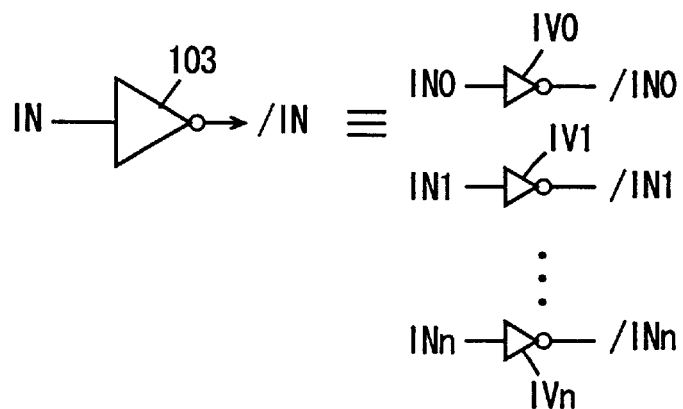
FIG. 3 is a diagram schematically showing a structure of an inverting circuit shown in FIG. 2.

FIG. 3 is a diagram showing a structure of an inverting circuit 103 shown in FIG. 2. As shown in FIG. 3, inverting circuit 103 inverts a logic value of a multiple bit input value IN bitwise for producing an output value /IN. More specifically, inverting circuit 103 includes inverters IV0 to IVn respectively provided corresponding to bits IN0 to INn of multiple bit input value IN. Inverters IV0 to IVn invert and output logical values of corresponding input bits. Thus, a logically inverted value /IN (1's complement) of input value IN is produced. The structure of inverting circuit 107 is similar to that of inverting circuit 103, and inverting circuit 107 inverts and outputs a logical value of 1-bit signal.

Figure 4:
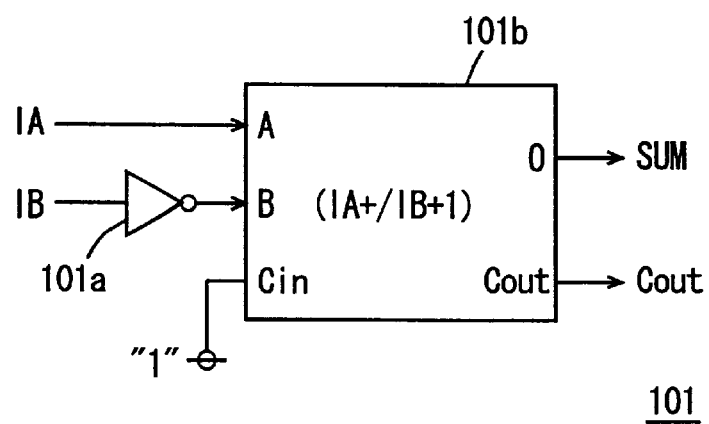
FIG. 4 is a diagram schematically showing a structure of a 2's complement subtractor shown in FIG. 2.

FIG. 4 is a diagram schematically showing a structure of the 2's complement subtractor shown in FIG. 2. Referring to FIG. 4, 2's complement subtractor 101 includes: an inverting circuit 101a inverting a multiple bit number value (binary number) applied to input IB; an input A receiving the multiple bit number value applied through input IA; an input B receiving an output value from inverting circuit 101a; and an addition circuit 101b having a carry input Cin receiving a signal of logic "1". An addition result SUM is output from output O of addition circuit 101b, and a carryout signal Cout is output from carry output Cout. A 1's complement value of the multiple bit number value inputted to input IB is produced by inverting circuit 101a. By applying logic "1" to carry input Cin, a 2's complement value of a numerical value applied to input IB is applied to addition circuit 101b. Addition of the binary value applied to input IA and the 2's complement value causes a subtraction value of numerical values applied to inputs IA and IB to be output as an addition result. When the numerical value applied to input IA is greater than that applied to input IB, carryout signal Cout becomes logic "1". In other words, 2's complement subtractor 101 performs subtraction by converting exponent value EB applied to input IB to the 2's complement and then adding the 2's complement value to exponent value EA applied to input IA.

Multiplexers 104, 105 and 106 select a numerical value applied to input I1 if a signal applied to selection input S is logic "1" and selects a numerical value applied to input I0 when a signal of logic "0" is applied to selection input SA.

Comparator 102 is a digital comparator. When exponent value EA applied to input CA is smaller than exponent value EB applied to input CB, the output signal of comparator 102 is asserted "0", and otherwise "1".

Figure 5:
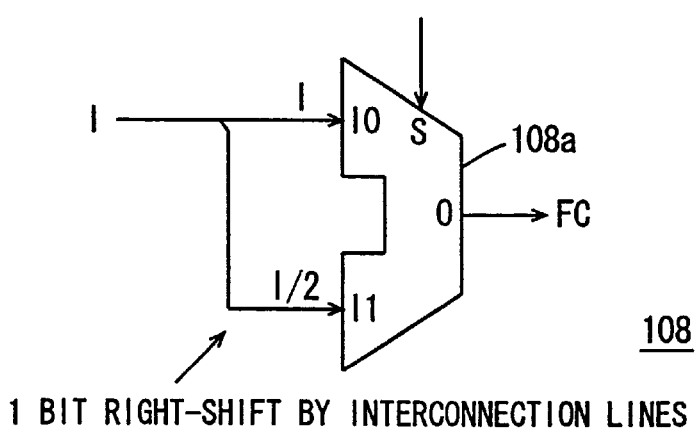
FIG. 5 is a diagram schematically showing a structure of a compensating shift circuit shown in FIG. 2.

FIG. 5 is a diagram schematically showing a structure of a compensating shift circuit 108 shown in FIG. 2. Referring to FIG. 5, compensating shift circuit 108 includes a 2:1 multiplexer 108a having its inputs I0 and I1 respectively receiving an input value I and a value I/2 obtained by right-shifting input value I by 1 bit for selecting one of the inputs in accordance with selection input S. If a control signal applied to selection input S is logic "0", 2:1 multiplexer 108a selects and outputs input value I, and when the control signal is logic "1", it selects and outputs input value I/2 which is obtained by right-shifting by 1 bit. The right-shifting by 1 bit is implemented by interconnection (logic right-shift by 1 bit). Referring to FIGS. 2 to 5, an operation of the apparatus according to the first embodiment of the present invention will now be described.

The 2's complement subtractor 101 outputs a subtraction value (EA−EB) from its output O. On the other hand, inverting circuit 103 has inverted all bits of subtraction value (EAEB) and, as a result, it produces 1's complement of subtraction value (EA−EB), which in turn is smaller than subtraction value (EB−EA) by 1 (when exponent value EB is greater than exponent value EA).

When an output signal from comparator 102 indicates that exponent value EA is equal to or greater than exponent value EB, 2:1 multiplexer 104 selects and outputs a value of difference (EA−EB) applied to input I1. In this case, value of difference (EA−EB) is 0 or positive, and an absolute value of the difference between exponent values EA and EB is correctly output from 2:1 multiplexer 104. In this state, 2:1 multiplexers 105 and 106 select and output fraction values FB and FA applied to their inputs I1, respectively. As inverting circuit 107 inverts the output signal from comparator 102, and in this case, the output signal from inverting circuit 107 is logic "0", and compensating shift circuit 108 selects and outputs an output value from 2:1 multiplexer 105 as shown in FIG. 5. Thus, when exponent value EA is equal to or greater than exponent value EB, right-shifting by 1 bit is not performed in compensating shift circuit 108.

An absolute value of difference |EA−EB| from multiplexer 104 indicates a correct value, and a right-shifting operation is executed for an output value FC from compensating shift circuit 108 in accordance with the value in a right-shift circuit provided in a next stage.

On the other hand, when the output signal from comparator 102 is logic "0", exponent value EA is smaller than exponent value EB. In this case, 2:1 multiplexer 104 selects and outputs the output value from inverting circuit 103. Then, the output value from 2:1 multiplexer 104, |EA−EB|, is a value approximating the correct absolute value of difference (a value smaller by 1).

2:1 multiplexer 105 selects fraction value FA for application to compensating shift circuit 108, whereas 2:1 multiplexer 106 selects and outputs fraction value FB. As an output signal from inverting circuit 107 is logic "1", compensating shift circuit 108 right-shifts the value applied to input I by 1 bit for output. Output value FC from compensating shift circuit 108 is right-shifted by 1 bit, to compensate for a value of output |EA−EB| of 2:1 multiplexer 104 which in turn is the 1's complement and is smaller than a correct value by 1. Thus, in the light-shift circuit in the next stage, if the shift operation is performed in accordance with the absolute value of the difference from multiplexer 104, a right-shifting operation is executed correctly on output value FC from multiplexer 105 in accordance with the absolute value of the difference between the exponent values.

In the structure shown in FIG. 2, only one 2's complement subtractor and only one comparator are used. Thus, the scale of the circuit is greatly reduced as compared with the structure in which two subtractors are used and, reduction in chip real estate and power consumption can be achieved. In addition, if a value of difference (EA−EB) is negative, the 1's complement thereof is output. An adding operation is not performed for further adding 1 in order to correct an error of an approximated value (a 1's complement value). Simply, logical right-shifting by 1 bit is performed in compensating shift circuit 108. The right-shifting by 1 bit is readily implemented simply by interconnection. Thus, an addition circuit for correcting the approximated value is not required, so that an operation speed is not reduced. Therefore, a preprocessing stage for right-shifting capable of operating at high speed with reduced chip real estate and power consumption can be achieved.

Modification

Figure 6:
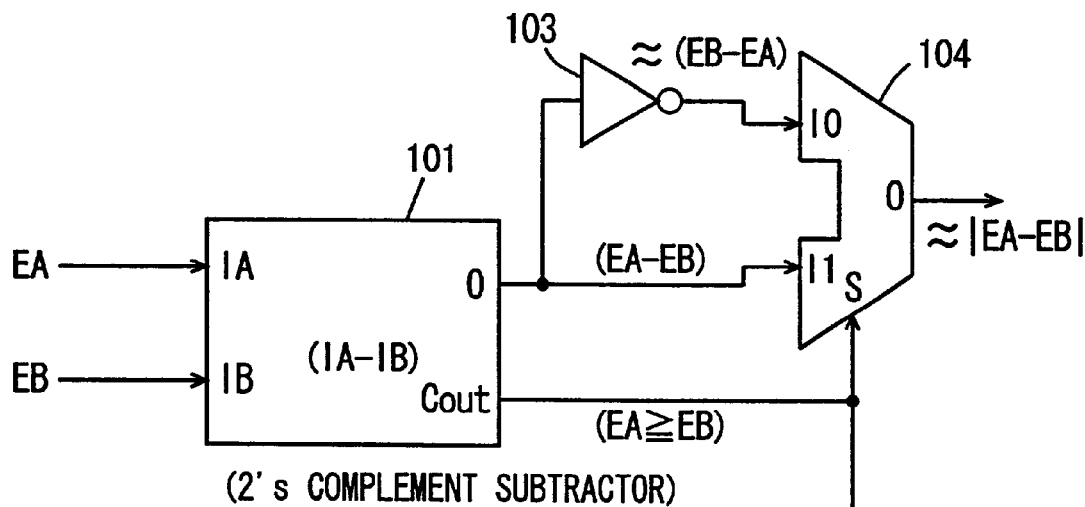
FIG. 6 is a diagram schematically showing a structure of a modification of the first embodiment of the present invention.
Figure 6:
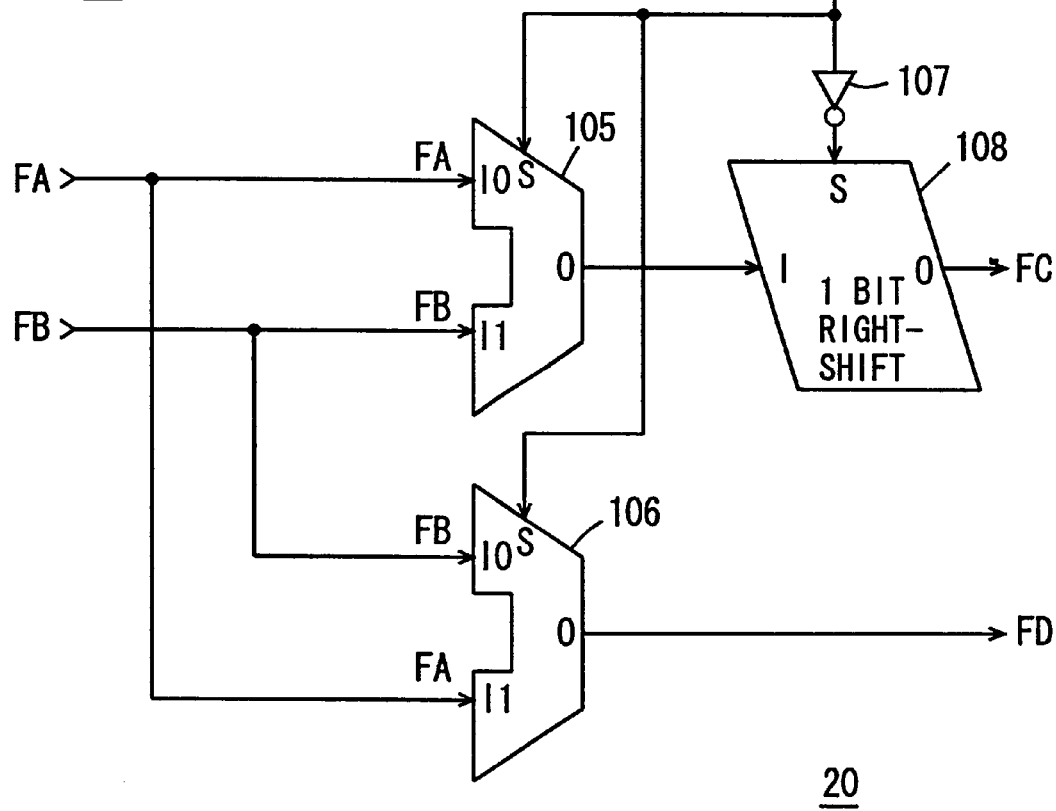

FIG. 6 is a diagram schematically showing a structure of a modification of the first embodiment of the present invention. Comparator 102 is not used in the structure shown in FIG. 6. Carryout signal Cout of 2's complement subtractor 101 is used as a selection control signal in place of the output signal from comparator 102. Other parts of the structure are the same as those in FIG. 2, and corresponding portions are denoted by the same reference characters.

The 2's complement of exponent value EB is given by $2^n-EB$. The adding operation is $(EA+2^n-EB)$. Thus, when exponent value EA is equal to or greater than exponent value EB, (EA−EB) is 0 or positive, so that a carry is caused by the term 2. In other words, when exponent value EA is equal to or greater than exponent value EB, carryout signal Cout turns to logic "1". Thus, carryout signal Cout of 2's complement subtractor 101 can serve exactly the same function as that of the output signal from comparator 102 shown in FIG. 2.

In the structure shown in FIG. 6. carryout signal Cout of 2's complement subtractor 101 is simply used as the selection control signal in place of the output signal from comparator 102, and the operation thereof is exactly the same as that of the structure shown in FIG. 2. Therefore, the detailed description thereof will not be repeated.

The structure shown in FIG. 6 allows further reduction in chip real estate and power consumption as a comparator is not used.

As described above, according to the first embodiment of the present invention, the absolute value of the difference between the exponent values is selectively produced using a single 2's complement subtractor and, when the absolute value of the difference between the exponent values is an approximated value, the fraction value is right-shifted by 1 bit for compensating for the error of the approximated value. Therefore, the absolute value of the difference between the exponent values for right-shifting operation can be correctly produced without any reduction in operation speed and with chip real estate reduced.

Second Embodiment

Figure 7:
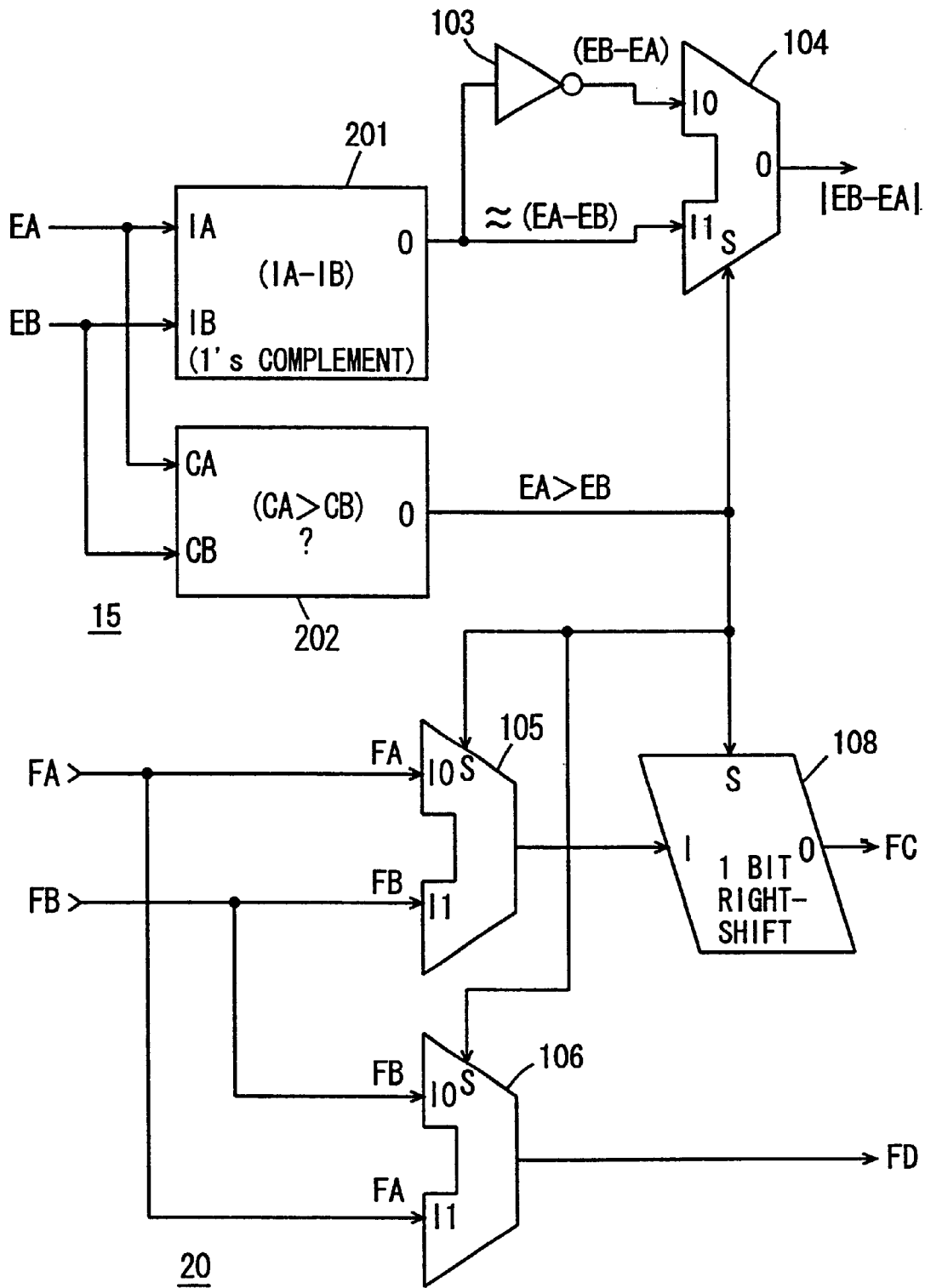
FIG. 7 is a diagram schematically showing a structure of a main portion of a floating-point calculation apparatus according to a second embodiment of the present invention.

FIG. 7 is a diagram schematically showing a structure of a preprocessing stage for right-shifting according to a second embodiment of the present invention. Referring to FIG. 7, an exponent value calculating unit 15 includes: an 1's complement subtractor 201 for subtracting an exponent value EA and a 1's complement of an exponent value EB; a comparator 202 comparing exponent values EA and EB; an inverting circuit 103 inverting all bits of an output value from 1's complement subtractor 201; and a multiplexer 104 selecting one of output values from inverting circuit 103 and 1's complement subtractor 201 in accordance with an output from comparator 202.

The 1's complement subtractor 201 converts exponent value EB to an 1's complement thereof $(2^n-1-EB)$ and then executes addition of exponent value EA and the 1's complement value. Thus, an output value from an output O of 1's complement subtractor 201 becomes a value which is smaller by one than the absolute value of the difference between the exponent values. On the other hand, inverting circuit 103 has inverted all bits of the output value from 1's complement subtractor 201, so that it calculates the 1's complement. The 1's complement of (EA+$2^n$-1-EB) is given by (EB-EA). Thus, a correct absolute value of difference (EB-EA) is output.

Comparator 202 asserts output O thereof "1" when exponent value EA applied to an input CA is greater than exponent value EB applied to an input CB (EA>EB), and otherwise asserts output thereof "0".

As in the case of the first embodiment, a swap unit 20 includes: a 2:1 multiplexer 106 selecting one of fraction values FA and FB in accordance with an output signal from comparator 202; a 2:1 multiplexer 105 selecting a fraction value in a manner complementary that of 2:1 multiplexer 105 in accordance with the output signal from comparator 202; and a compensating shift circuit 108 selectively right-shifting by 1 bit for the output value from 2:1 multiplexer 105 in accordance with the output signal from comparator 202.

As inverting circuit 107 is not provided, compensating shift circuit 108 right-shifts by 1 bit when the output signal from comparator 202 is logic "1", unlike the case of the first embodiment.

Figure 8:
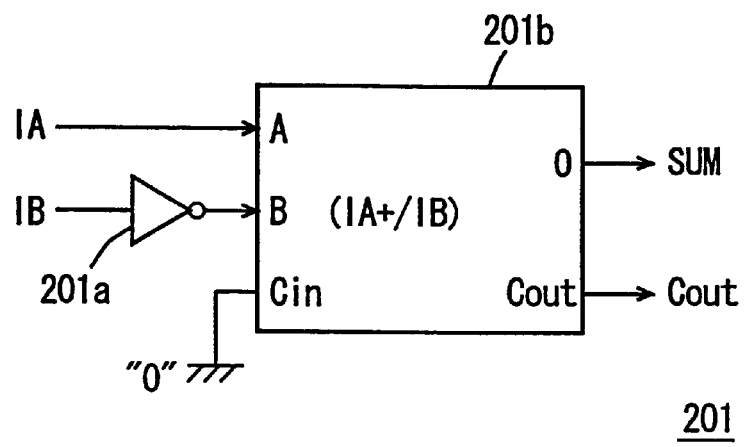
FIG. 8 is a diagram schematically showing a structure of a 1's complement subtractor shown in FIG. 7.

FIG. 8 is a diagram schematically showing a structure of 1's complement subtractor 201 shown in FIG. 7. Referring to FIG. 8, 1's complement subtractor 201 includes: an inverting circuit 201a inverting an exponent value applied to an input IB; and an addition circuit 201b having its carry input connected to logic "0" and adding an exponent value applied to an input A and an output value from inverting circuit 201a applied to an input B. Addition circuit 201b has its carry input Cin and input B respectively receiving logic "0" and the output value from inverting circuit 201a. Inverting circuit 20 la produces an 1's complement of the exponent value applied to input IB. Thus, addition circuit 201b performs addition of exponent value EA applied to input IA and the 1's complement value of exponent value EB applied to input IB for outputting an addition result SUM and carryout signal Cout from output O and carryout output Cout, respectively. The structure of compensating shift circuit 108 is similar to that shown in the above described first embodiment, and the structures of multiplexers 104, 105 and 106 are also similar to those of the first embodiment. An operation of the preprocessing stage for right-shifting shown in FIG. 7 will now be described.

1's complement subtractor 201 performs the subtraction operation for producing an approximated value≈(EA-EB). Comparator 202 determines which of exponent values EA and EB is greater. If exponent value EB is equal to or greater than exponent value EA, the output signal from comparator 202 is logic "0". In this state, the output value from 1's complement subtractor 201 is 0 or negative. The 2:1 multiplexer 104 selects and outputs an output value (EB-EA) from inverting circuit 103 applied to input I0 in accordance with the output signal from comparator 202. If exponent value EB is equal to or greater than exponent value EA, the output value of inverting circuit 103 is a correct absolute value of the difference. Thus, a correct absolute value of the difference |EB-EA| is produced by multiplexer 104.

Multiplexer 105 selects fraction value FA applied to input I0 and applies it to compensating shift circuit 108, whereas multiplexer 106 selects fraction value FB applied to input I0. As the output signal from comparator 202 is logic "0", compensating shift circuit 108 does not perform a shift operation (see FIG. 5).

On the other hand, when the output signal from comparator 202 is logic "1", exponent value EA is greater than exponent value EB. In this case, the output value from 1's complement subtractor 201 is positive. However, as 1's complement subtraction is performed, a value of difference (EA-EB) is smaller by 1 than a correct value at the time. Multiplexer 104 selects and outputs a value of difference ≈ (EA-EB) applied to input I1 in accordance with the output signal from comparator 202. On the other hand, multiplexer 105 selects fraction value FB applied to input I1 for application to compensating shift circuit 108, and multiplexer 106 selects and outputs fraction value FA applied to input I1. As the output signal from comparator 202 is logic "1", compensating shift circuit 108 performs right-shift by 1 bit for producing an output value FC. Thus, when the absolute value of difference |EB-EA| output from multiplexer 104 is smaller by 1 than the correct value, compensating shift circuit 108 performs right-shifting by 1 bit for compensating for the error of the absolute value of the difference. Therefore, the right-shift circuit in the next stage performs right-shifting operation even in accordance with the absolute value of the difference, resulting in correct digit alignment.

Even when 1's complement subtractor 201 is used, only one subtractor is used. Thus, the scale of the circuit can be greatly reduced as compared with the conventional apparatus, whereby corresponding reduction in chip real estate and power consumption can be achieved. In addition, even if an error is caused in the absolute value of the difference, the adding operation is not performed for compensating for the error, and instead 1-bit (logic) right-shift is simply executed in the compensating shift circuit. Therefore, the increase in operating time due to the adding operation for compensating for the error of the absolute value of the difference is prevented.

Modification

Figure 9:
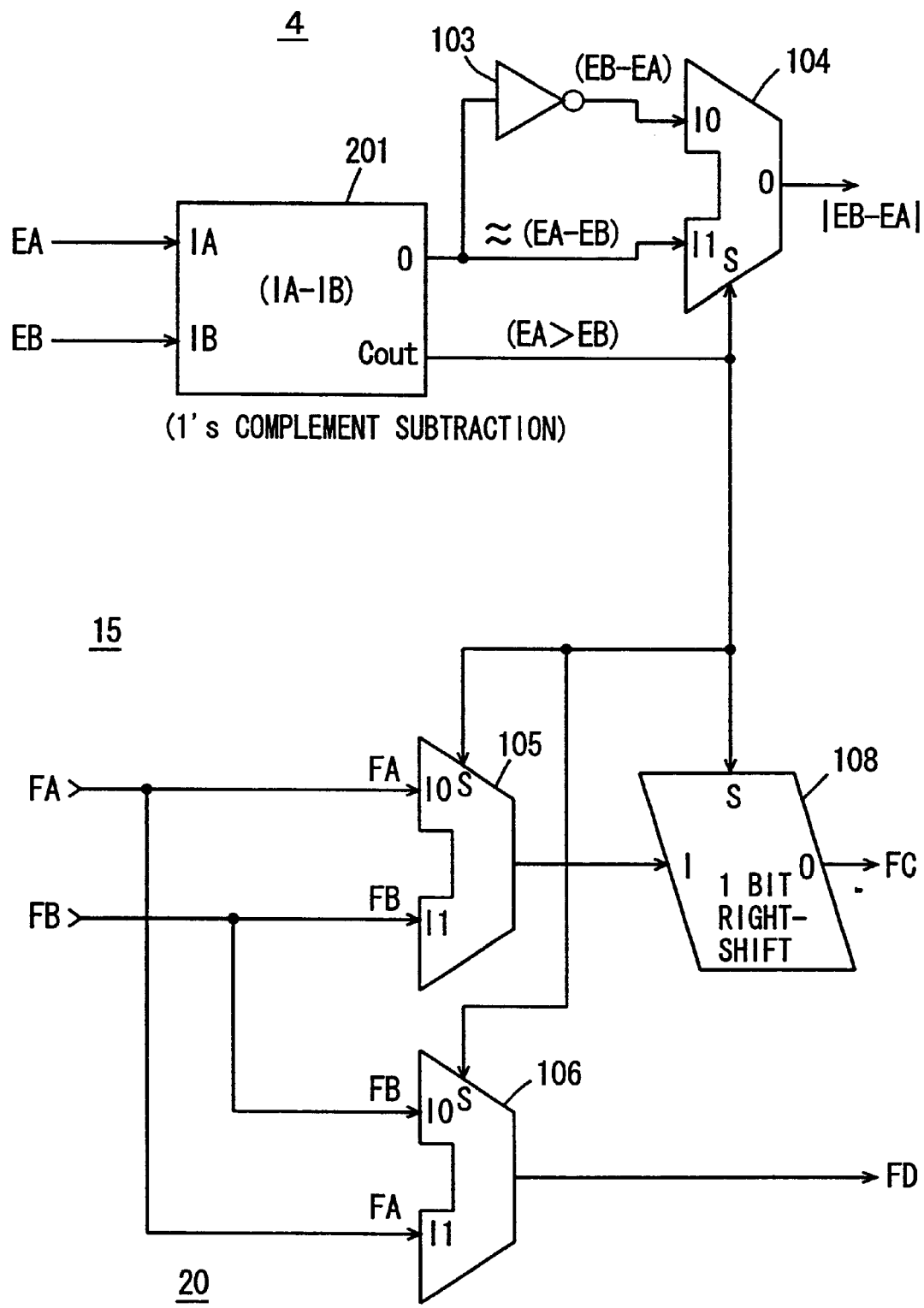
FIG. 9 is a diagram schematically showing a structure of a modification of the second embodiment of the present invention.

FIG. 9 is a diagram schematically showing a structure of a modification of the second embodiment of the present invention. The structure shown in FIG. 9 differs from that shown in FIG. 7 in the following respect. More specifically, a carryout signal Cout of a 1's complement subtractor 201 is used as a selection control signal in place of the output signal from comparator 202. Comparator 202 is not used. An operation of (EA+$2^n$-EB-1) is performed in 1's complement subtractor 201. Even when exponent value EA equals to exponent value EB, carry is not caused. Carry is caused only when exponent value EA is greater than exponent value EB and the term (-1) is deleted. Thus, carryout signal Cout of 1's complement subtractor 201 becomes logic "1" when exponent value EA is greater than exponent value EB, and otherwise becomes logic "0". Accordingly, carryout signal Cout of 1's complement subtractor 201 is a signal with the same logic as that of the output signal from comparator 202 shown in FIG. 7. As a result, a function and effect which is the same as that of the structure shown in FIG. 7 can be obtained even when the structure shown in FIG. 7 is used. As the comparator for producing the selection control signal is not necessary, reduction in chip real estate and power consumption can be achieved.

As described above, according to the second embodiment of the present invention, the absolute value of the difference between the exponent values is calculated using the 1's complement subtractor, and right-shifting by 1 bit is performed by the compensating shift circuit when the approximated value is used. Therefore, the number of the circuit components can be reduced without any decrease in the operation speed, whereby reduction in chip real area and power consumption can be achieved.

Third Embodiment

Figure 10:
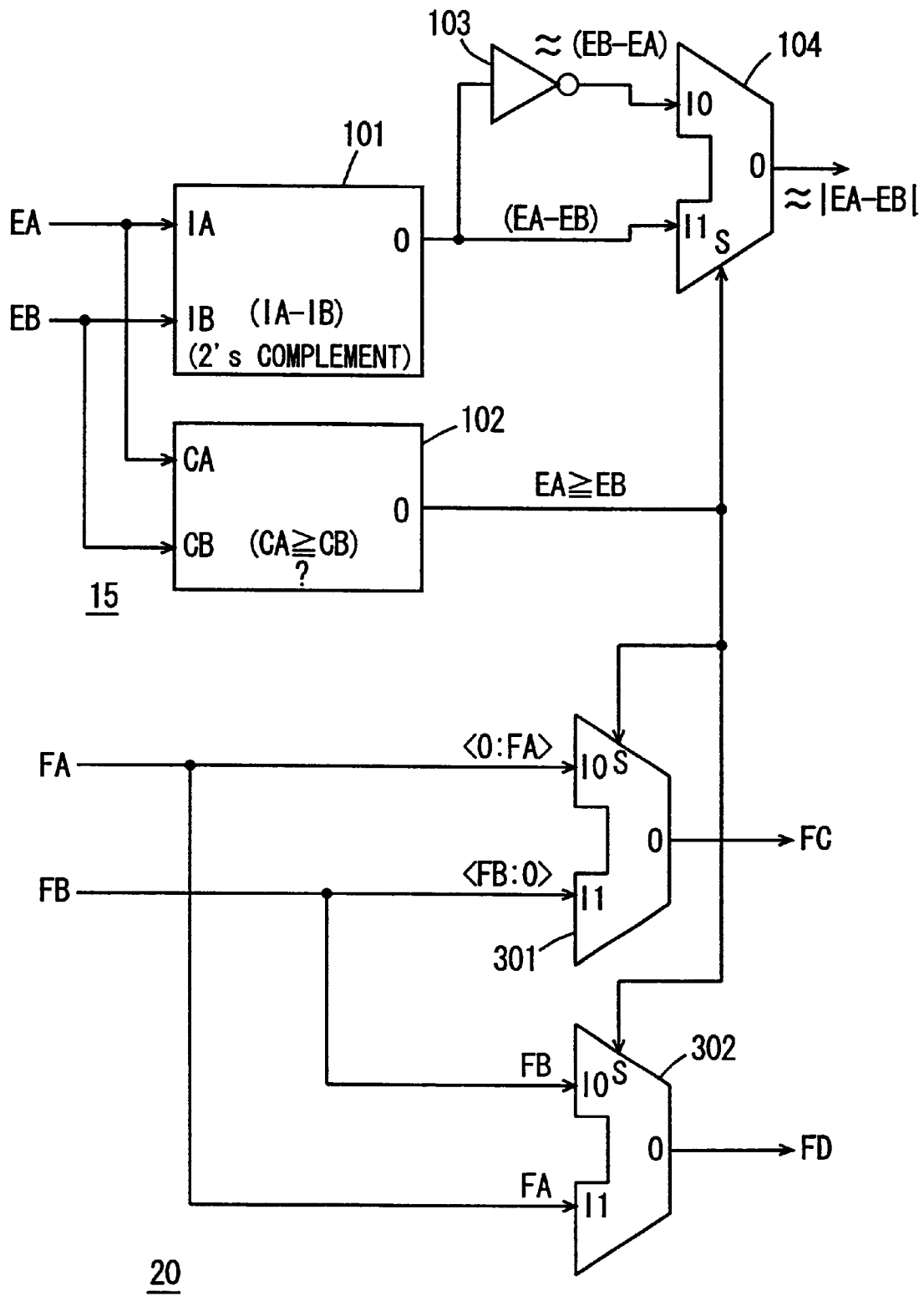
FIG. 10 is a diagram schematically showing a structure of a main portion of a floating-point calculation apparatus according to a third embodiment of the present invention.

FIG. 10 is a diagram schematically showing a structure of a preprocessing stage for right-shifting according to a third embodiment of the present invention. The structure in FIG. 10 is different in structure of a swap unit 20 from that shown in FIG. 2. Swap unit 20 shown in FIG. 10 includes a shift/multiplex combination unit 301 having its inputs I0 and I1 respectively receiving values <0:FA> and <FB:0> obtained by adding "0" to the most significant bit position and the least signal bit position of fraction values FA and FB for selecting upper n bits of one of the fraction values in accordance with an output signal from comparator 102 and producing a fraction value FC. A multiplexer 302 selects and outputs one of fraction values FB and FA in accordance with the output signal from comparator 102 similarly as the structure shown in FIG. 2. A structure of an exponent difference calculating unit 15 shown in FIG. 10 is the same as that shown in FIG. 2.

A shift operation is executed simultaneously with a selecting operation by shift/multiplex combination unit 301 in the structure shown in FIG. 10. More specifically, when the output signal from comparator 102 is logic "1", shift/multiplex combination unit 301 selects fraction value <FB:0> applied to input I1, and selects and outputs the upper bits of fraction value FB. A compensating shift operation needs not be performed as exponent value EA is greater than exponent value EB. On the other hand, when the output signal from comparator 102 is logic "0", shift/multiplex combination unit 301 selects fraction value <0:FA> applied to input I0, and selects and outputs upper bits other than the least significant bit. Thus, in this case, the least significant bit of fraction value FA is truncated, and "0" is added to the most significant bit thereof, so that 1-bit right-shift is achieved. A signal to an input portion in combination unit 301 is implemented by interconnection lines. An additional circuit such as a register circuit particularly needs not be provided (this is not applied in the case where a pipeline operation is performed). Thus, right-shifting by 1 bit for compensation is performed simultaneously with the fraction value selection operation, and a gate delay required for right-shifting by 1 bit is eliminated, whereby fast preprocessing for right-shifting is achieved (fraction value FC can be driven into a definite state at a high speed).

Figure 11:
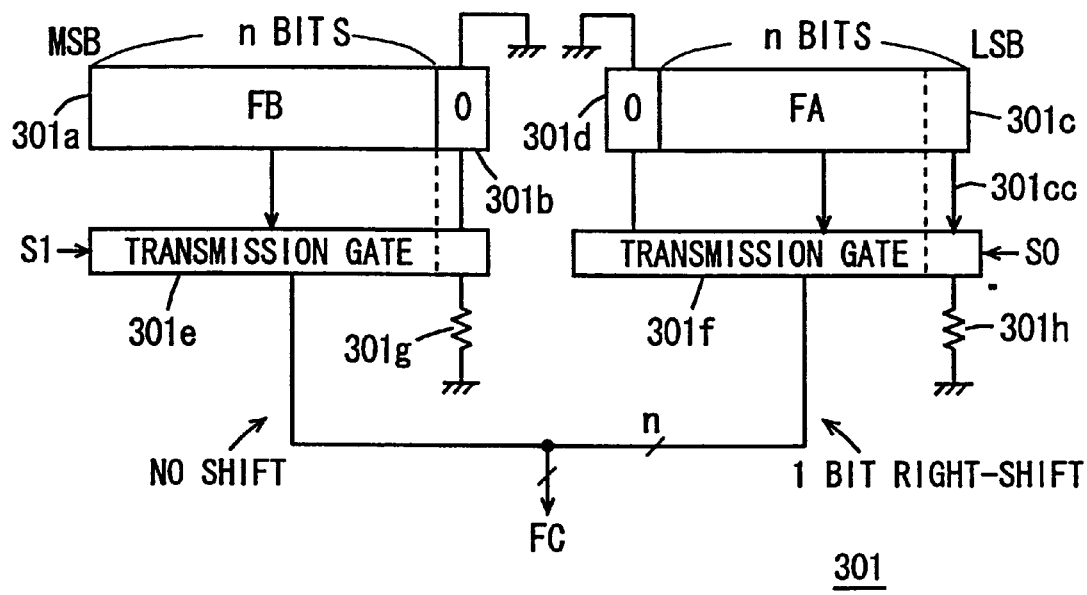
FIG. 11 is a diagram schematically showing a structure of a shift/multiplex combination unit shown in FIG. 10.

FIG. 11 is a diagram schematically showing a structure of shift/multiplex combination unit 301 shown in FIG. 10.

Referring to FIG. 11, shift/multiplex combination unit 301 includes: a signal interconnection line 301a for transmitting n-bit fraction value FB; an interconnection line 301e further provided in the least significant bit position of fraction value FB for transmitting a signal of logic "0"; an interconnection line 301c transmitting n-bit fraction value FA; an interconnection line 301d provided in the most significant bit position of fraction value FA for transmitting a signal of logic "0"; a transmission gate 301e for selecting and transmitting fraction value FB of upper n bits of interconnection lines 301a and 301b in accordance with a selection signal S1; and a transmission gate 301f for selecting and transmitting the fraction value of upper (n−1) bits and the most significant bit of "0" in accordance with a selection signal S0. Transmission gate 301e also connects signal interconnection line 301b to a ground (logic "0") through a resistance element 301g. Transmission gate 30 if further connects a signal line 301c transmitting the least significant bit of fraction value FA through a resistance element 301h. Transmission gates 301e and 301f may be comprised of CMOS transmission gates.

Both of inputs of shift/multiplex 301 are of (n+1) bits, so that symmetry thereof is maintained. The signal of logic "0" is applied to transmission gate 301e in order to equalize loads of selection signals S1 and S0 (the transmission gate includes gate circuits of (n+1) bits). In addition, the least significant bit of fraction value FA is connected to resistance element 301h through signal interconnection line 301cc in transmission gate 301f in order to equalize a load of each bit of fraction value FA, so that skew is not caused in propagation of each bit of fraction value FA and a definite timing of fraction value FA is not delayed in multiplexer 302 shown in FIG. 10.

Further, the signal line of the least significant bit of fraction value FA is not simply kept in an open state, in order to prevent any reflection of the signal due to an impedance mismatch.

The structure shown in FIG. 11 allows logic right-shifting and left-shifting by 1 bit to be readily achieved simply by adding the signal interconnection line, so that the compensating shift operation is performed by transmission gates 301e and 301f. The n-bit signal interconnection lines from transmission gates 301f and 301e are connected to each other for transmitting a fraction value FC.

It is noted that selection signals S1 and S0 are activated when the signal applied to selection input S is logic "1" and "0", respectively.

Modification

Figure 12:
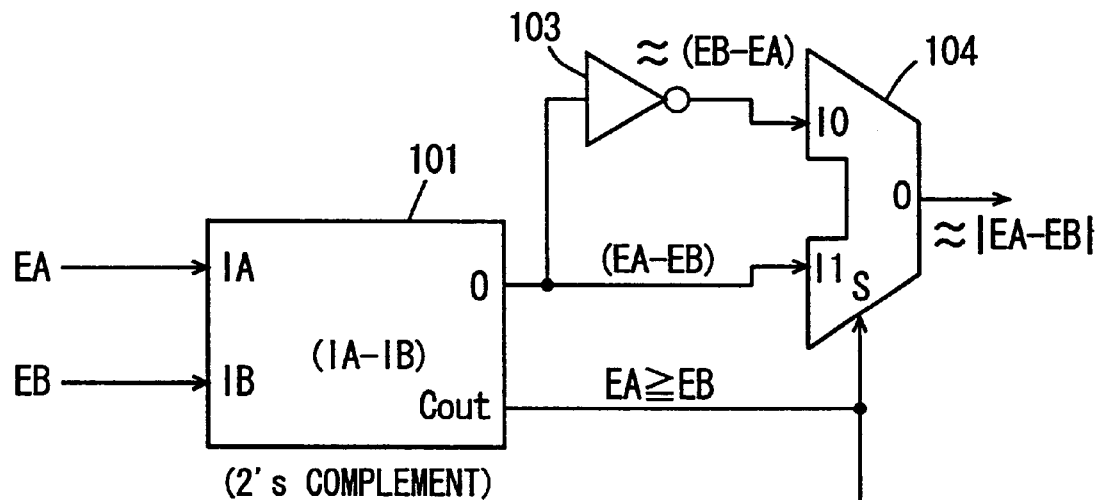
FIG. 12 is a diagram schematically showing a structure of a modification of the third embodiment of the present invention.
Figure 12:
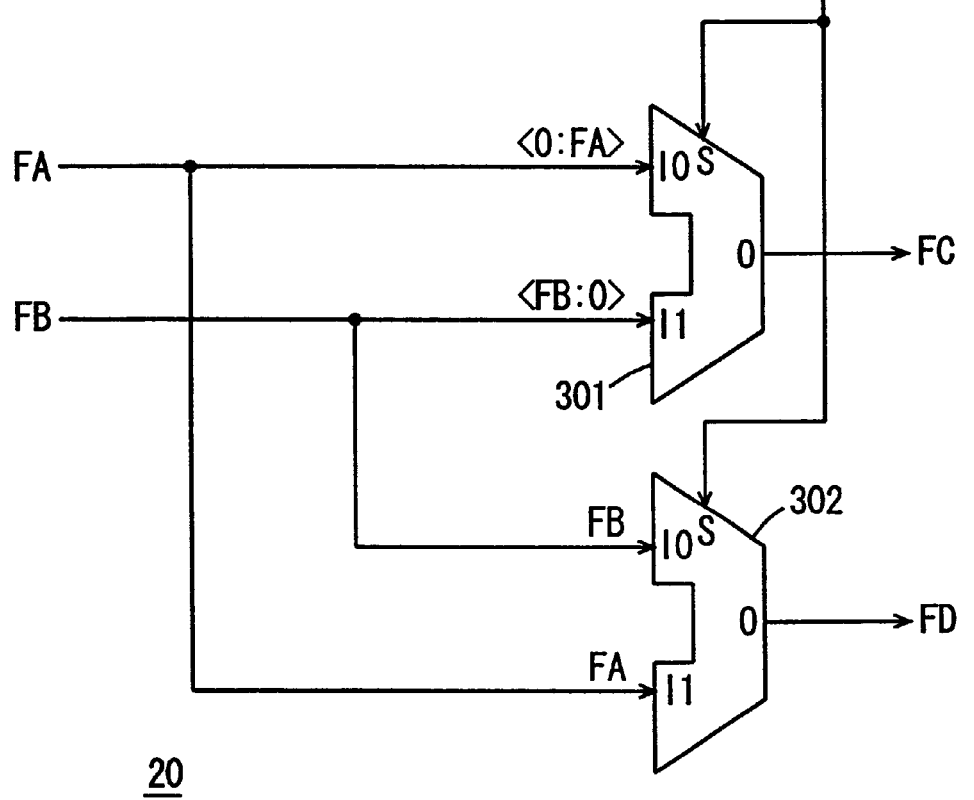

FIG. 12 is a diagram schematically showing a structure of a modification of the third embodiment of the present invention. The structure shown in FIG. 12 differs from that shown in FIG. 10 in that a carryout signal from 2's complement subtractor 101 is used as a selection control signal in place of an output signal from a comparator. Other parts of the structure are the same, and the corresponding portions are denoted by the same reference numerals.

As described in connection with the first embodiment, carryout signal Cout of 2's complement subtractor 101 has the same logic function as that of the output signal from comparator 102. Thus, by utilizing carryout signal Cout of 2's complement subtractor 101 as the selection control signal, need for the comparator is eliminated and chip real estate is reduced. As a result, a preprocessing for right-shifting circuit capable of operating at a high speed with reduced chip real estate and power consumption can be achieved.

As in the foregoing, according to the third embodiment of the present invention, in the swap unit for selecting the fraction value in accordance with the output value from the 2's complement subtractor, the fraction value selection and compensating shift operations are simultaneously performed. Thus, the fraction value can be driven into a definite state at a high speed.

Fourth Embodiment

Figure 13:
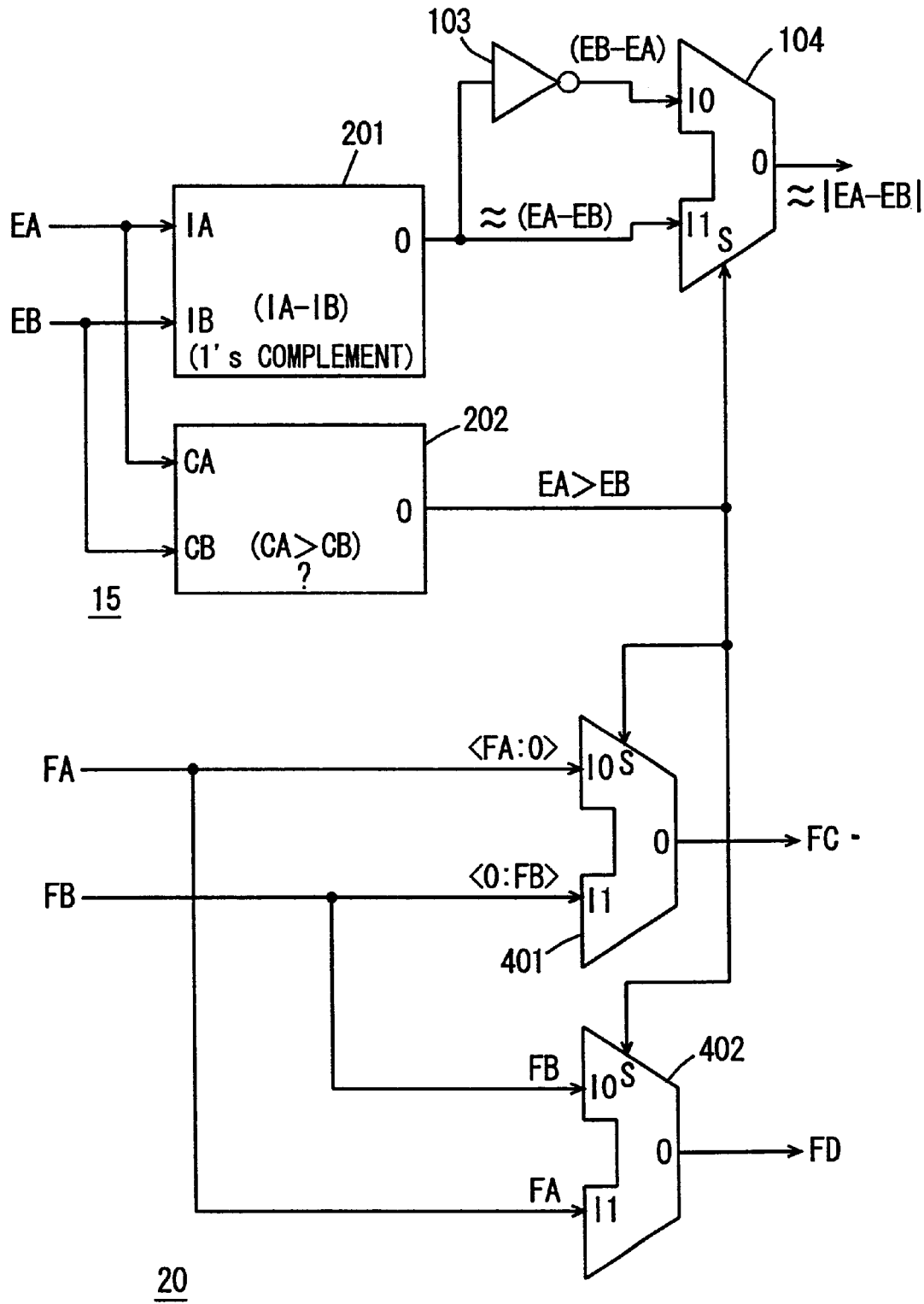
FIG. 13 is a diagram schematically showing a main portion of a floating-point calculation apparatus according to a fourth embodiment of the present invention.

FIG. 13 is a diagram schematically showing a structure of a preprocessing for right-shifting circuit according to a fourth embodiment of the present invention. In the structure shown in FIG. 13, a swap unit 20 has a structure different from that shown in FIG. 7.

Swap unit 20 includes: a shift/multiplex combination unit 401 selecting one of fraction values FA and FB in accordance with an output signal from comparator 202 and simultaneously and selectively executing a compensating shift operation; and a 2:1 multiplexer 402 selecting one of fraction values FB and FA in accordance with the output signal from comparator 202.

Shift/multiplex combination unit 401 selects upper n bits of one of bit-expanded values <FA:0> and <0:FB> respectively obtained by bit-expanding fraction values FA and FB by 1 bit in accordance with the output signal from comparator 202. The logic shifting in shift/multiplex combination unit 401 is achieved by interconnection lines as shown in FIG. 11. When the output signal from comparator 202 is logic "1", 1-bit right-shifted and expanded value <0:FB> applied to input I1 is selected and upper n bits thereof is output. When the output signal from comparator 202 is logic "1", exponent value EA is greater than exponent value EB. However, as the output value from 1's complement subtractor 201 is an approximated value, fraction value FB is right-shifted by 1 bit. Thus, by selecting the upper n bits of (n+1) bit value <0:FB> by shift/multiplex combination unit 401 logic right-shifting by 1 bit is performed. On the other hand, when the output signal from comparator 202 is logic "0", upper n bits of (n+1) bit value <FA:0> applied to input I0 are selected. Thus, fraction value FA is selected and applied to a right-shift circuit as fraction value FC.

The 2:1 multiplexer 402 selects its input value in accordance with the output signal of comparator 202 in a similar manner as combination unit 401. However, the input values to multiplexer 402 are placed in the reversed arrangement with respect to the fraction values applied to an input to combination unit 401. Thus, when exponent value EA is greater than exponent value EB, fraction value FA is selected. Conversely, when exponent value EA is equal to or smaller than exponent value EB, fraction value FB is selected.

As shown in FIG. 13, also in the structure using the 1's complement subtractor, by simultaneously executing shift and selection operations in shift/multiplex combination unit 401, fraction value FC is driven into a definite state at a high speed, thereby achieving fast operation.

It is noted that expansion of the fraction value to a (n+1)-bit value is readily achieved by exchanging fraction value FB and fraction FA in the structure shown in FIG. 11.

Modification

Figure 14:
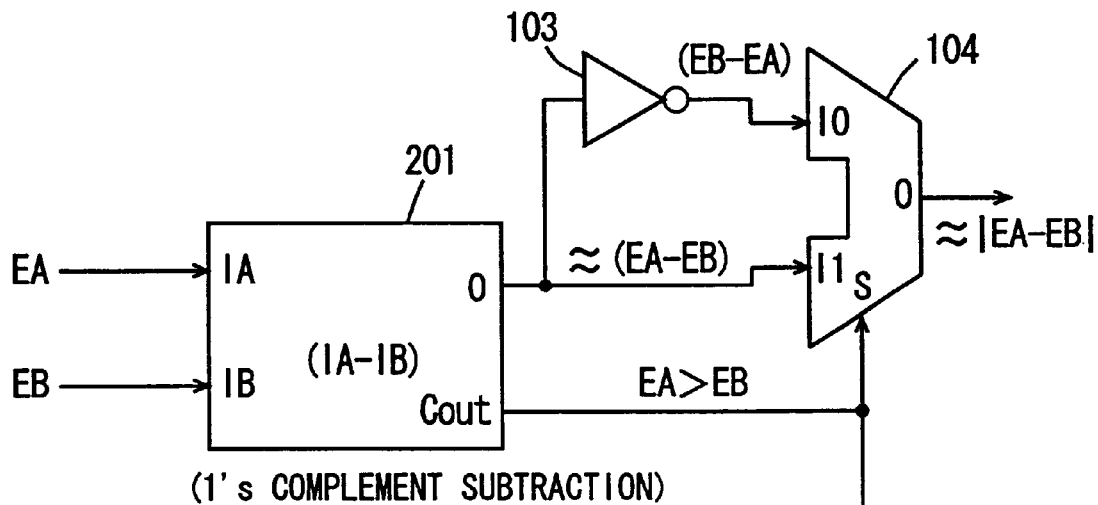
FIG. 14 is a diagram schematically showing a structure of a first modification of the fourth embodiment of the present invention.
Figure 14:
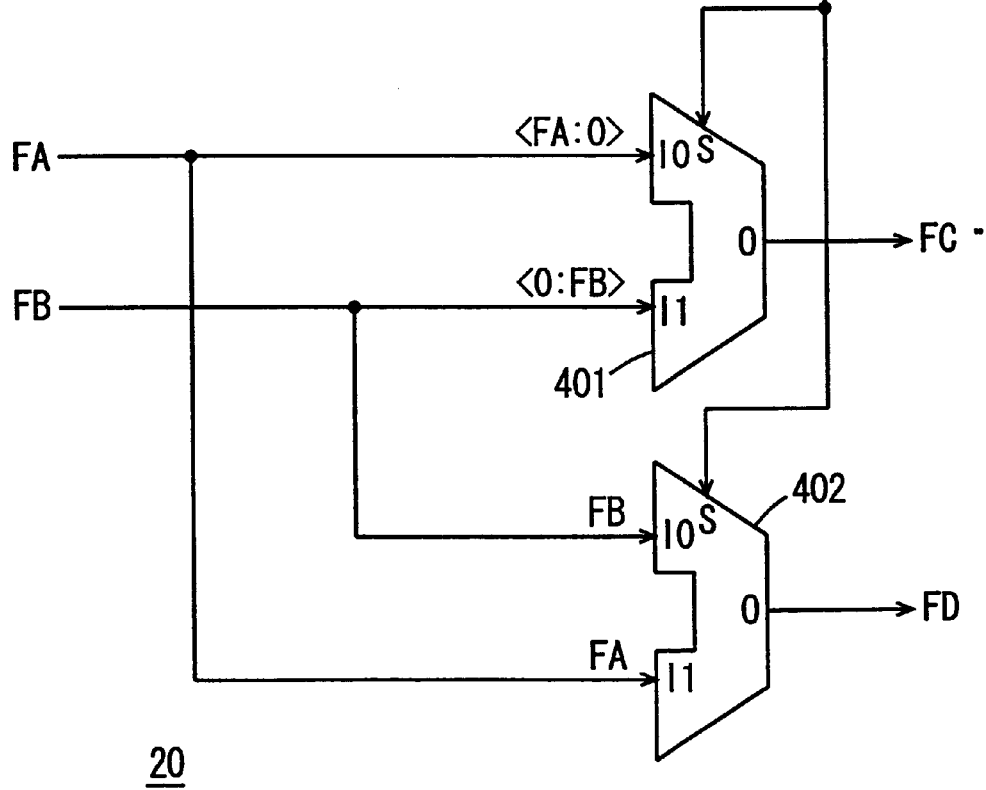

FIG. 14 is a diagram schematically showing a structure of a modification of the fourth embodiment of the present invention. In the structure shown in FIG. 14, a carryout signal Cout from the 1's complement subtractor 201 is applied to a shift/multiplex combination unit 401 and a 2:1 multiplexer 402 as a selection control signal, and also applied to a multiplexer 104 as a selection control signal. Other parts of the structure are the same as those shown in FIG. 13, and the corresponding portions are denoted by the same reference numerals.

Carryout signal Cout of 1's complement subtractor 201 has the same logical function as that of a comparator 202 (see FIG. 13). Thus, by utilizing carryout signal Cout of 1's complement subtractor 201 as the selection control signal, further reduction in chip real estate is achieved in addition to obtaining the effect ensured from the structure shown in FIG. 13.

Second Modification

Figure 15:
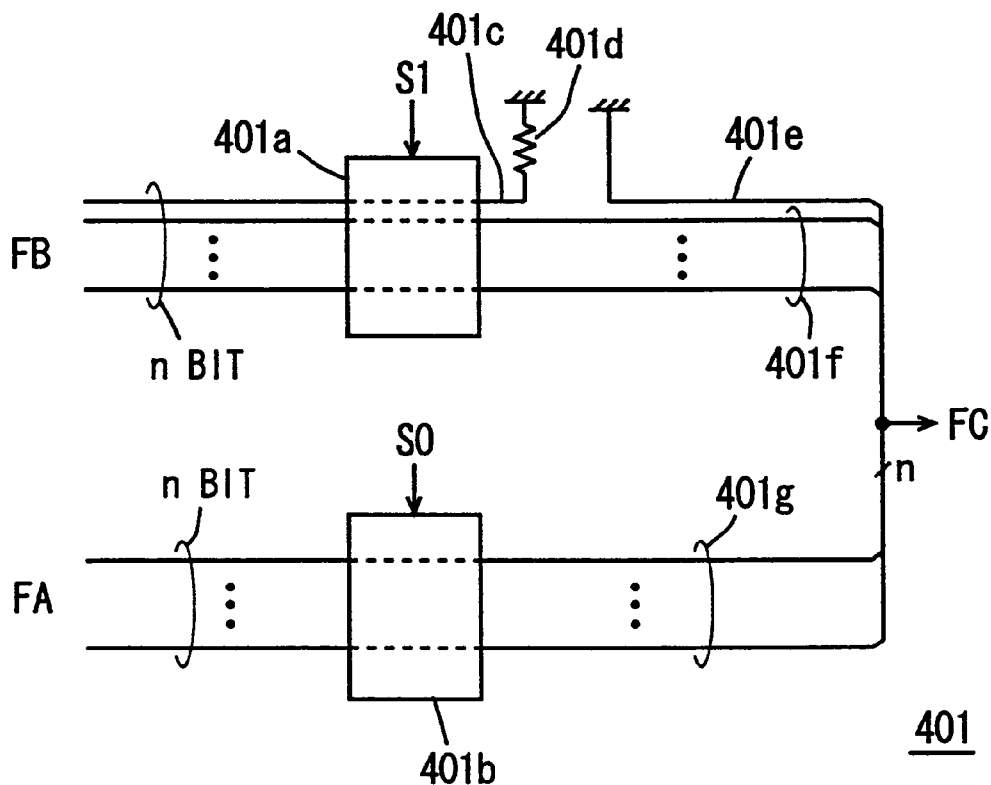
FIG. 15 is a diagram schematically showing a structure of a second modification of the fourth embodiment of the present invention.
Figure 16:
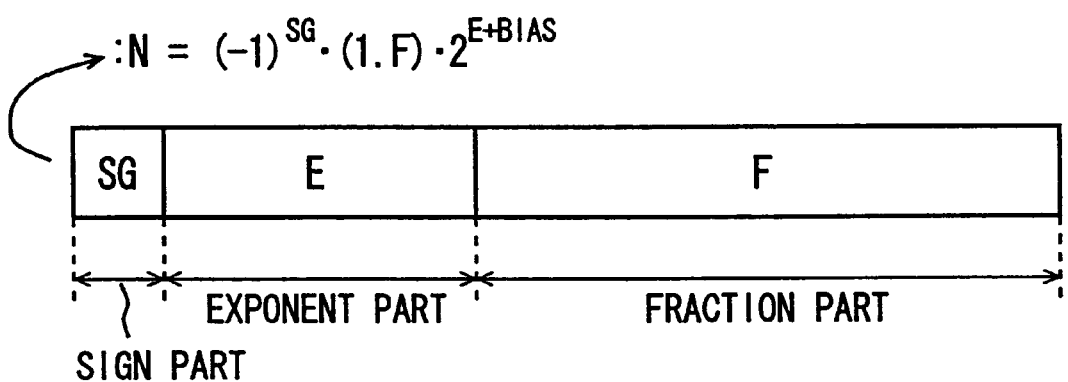
FIG. 16 is a diagram schematically showing a format of a floating-point number.
Figure 17:
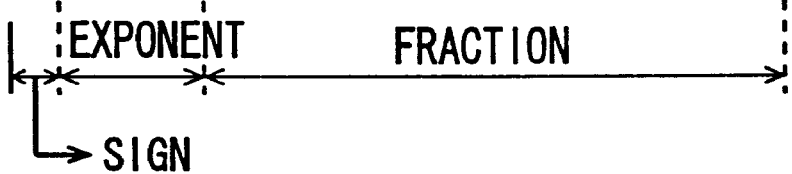
FIG. 17 is a diagram depicting digit alignment process of floating-point numbers.
Figure 18:
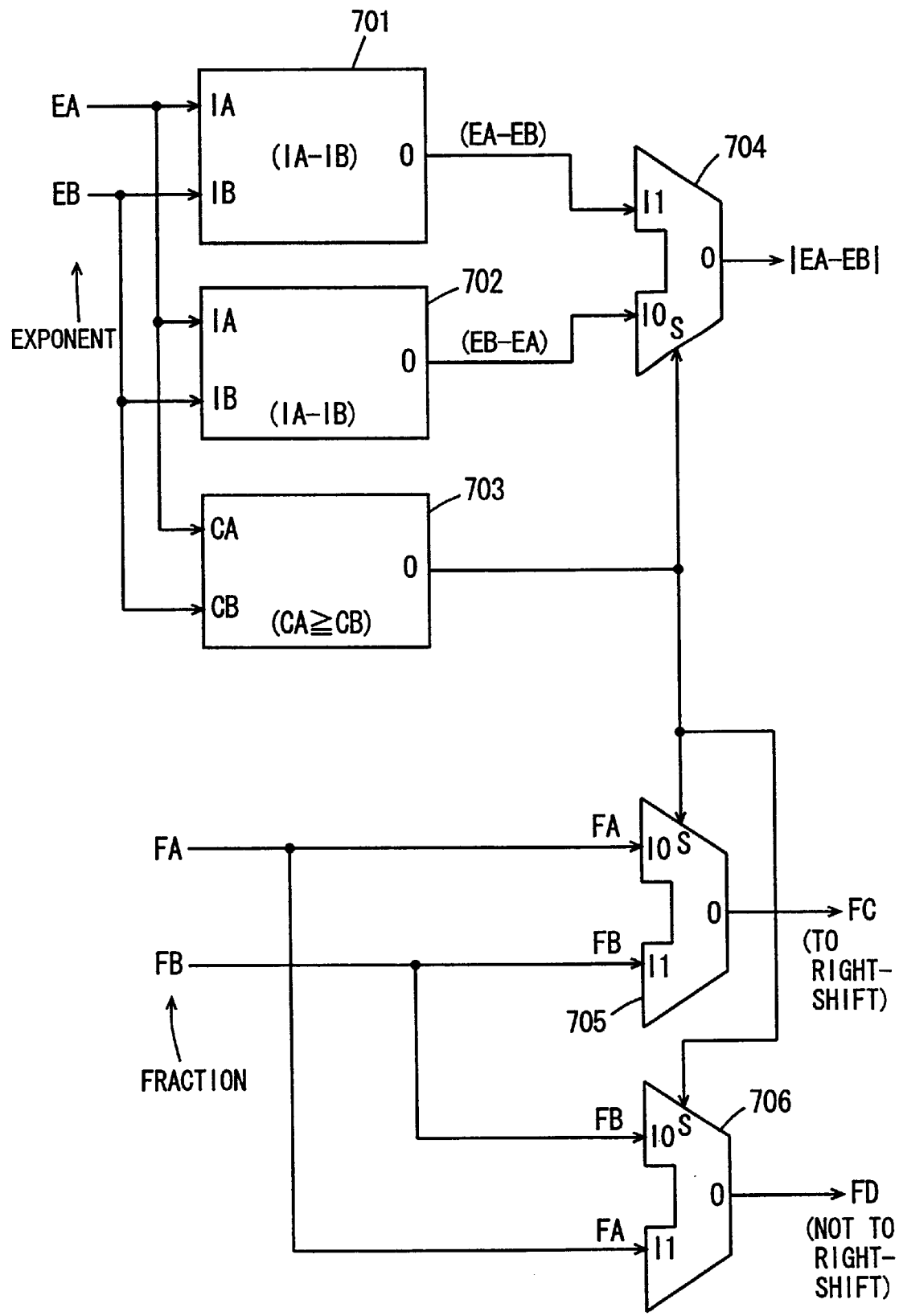
FIG. 18 is a diagram schematically showing a structure of a conventional portion for calculating an absolute value of the difference between exponents for digit alignment.
Figure 19:
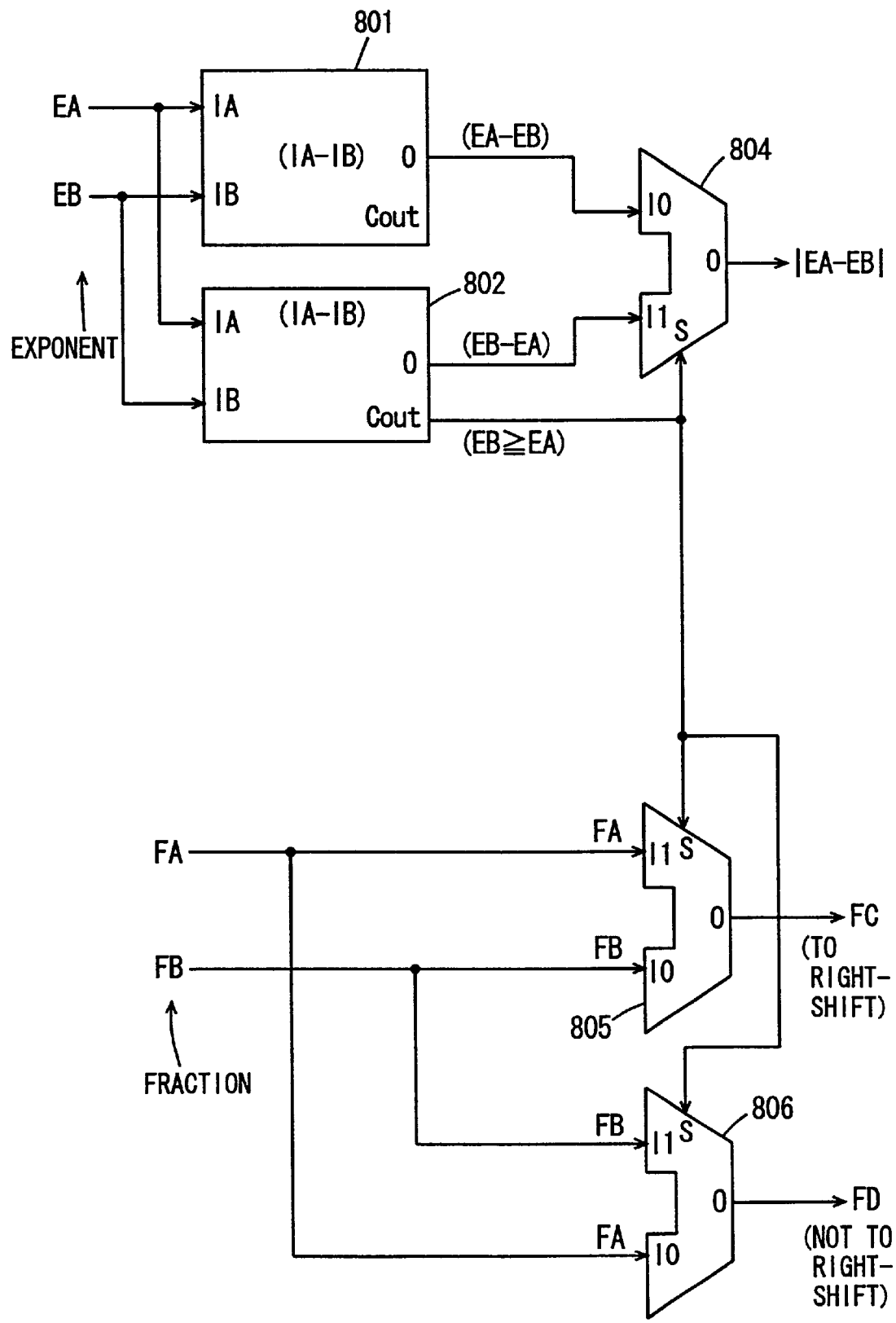
FIG. 19 is a diagram schematically showing a structure of another conventional portion for calculating an absolute value of the difference between exponent values for right-shifting.

FIG. 15 is a diagram schematically showing a structure of a second modification of the fourth embodiment of the present invention. A structure of shift/multiplex combination unit 401 shown in FIG. 14 is schematically shown in FIG. 15. Referring to FIG. 15, shift/multiplex combination unit 401 includes: a selector 401a selecting an n-bit fraction value FB in accordance with a selection control signal S1; a selector 401b selecting an n-bit fraction value FA in accordance with a selection control signal S0; a resistance element 401d connecting a signal line 401c of the most significant bit of selector 401a to a ground; a signal line 401e connected to the ground; a signal line 401f transmitting a lower (n−1)-bit output of selector 401a; and a signal line 401g transmitting an n-bit output of selector 401b. Signal lines 401e and 401f are connected to each other for transmitting an n-bit fraction value FC.

Selectors 401a and 401b are n-bit selectors in the structure shown in FIG. 15. A signal line of the most significant bit of selector 401a is connected to the ground through resistance element 401d. The resistance element 401d is a pull down resistance element. A signal line 401e is arranged in the most significant bit position and is connected to a ground voltage for transmitting logic "0" in place of signal line 401c. Thus, an output signal from selector 401a equivalently turns to a value obtained by logically right-shifting fraction value FB by 1 bit. On the other hand, as selector 401b needs not perform a compensating shift operation, it transmits n-bit fraction value FA onto signal line 401g in accordance with selection control signal S0.

As shown in FIG. 15, even if the most significant bit is replaced with logic "0" in an output stage of selector 401a, the shift and selection operations are simultaneously performed without adversely affecting propagation of the signal of the most significant bit of fraction value FB.

The structure shown in FIG. 15 can also be applied to shift/multiplex combination unit 301 in the above described third embodiment.

As in the foregoing, according to the fourth embodiment of the present invention, the shift and selection operations are simultaneously performed at the time of compensation shift of the fraction value in the structure for calculating an absolute value of the difference between the exponent values in accordance with the output signal from the 1's complement subtractor, so that fast operation is achieved.

As described above, according to the present invention, an absolute value of the difference between exponent values is calculated using one subtractor, and one of an output from the subtractor and an inverted value thereof is selected depending on which of the exponent values is greater. Thus, the scale of the circuit is reduced, and corresponding reduction in power consumption can be achieved. In addition, if a carryout signal of the subtractor is used as a control signal indicating which of the exponent values is greater, need for a comparator is eliminated and the scale of the circuit is further reduced.

Further, as a compensation shift operation is performed for the fraction value when an absolute value of the difference of an approximated value is selected, right-shifting is correctly performed in a next stage.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A floating-point calculation apparatus for performing a calculation of operands in floating-point representation including an exponent value and a fraction value, comprising:

a subtractor for subtracting exponent values of first and second operands;

an inverting circuit for inverting an output value from said subtractor;

a first selection circuit for selecting one of said output value from said subtractor and an output value from said inverting circuit in accordance with an indication signal indicating which of the exponent values of said first and second operands is greater, for producing an absolute value of difference for right-shifting of a fraction value;

a second selection circuit for selecting one of the fraction values of said first and second operands in accordance with said indication signal; and right-shift circuitry for right-shifting an output value of said second selection circuit in accordance with an output value of said first selection circuit and said indication signal.

2. The floating-point calculation apparatus according to claim 1, wherein said indication signal is produced by a comparison circuit for comparing said exponent values of said first and second operands.

3. The floating-point calculation apparatus according to claim 2, wherein said subtractor converts the exponent value of the second operand to an 1's complement thereof for addition, and said first selection circuit selects and outputs an output signal from said subtractor when the indication signal outputted from said comparison circuit indicates that the exponent value of the first operand is greater than that the exponent value of said second operand.

4. The floating-point calculation apparatus according to claim 2, wherein said subtractor converts the exponent value of the second operand to a 2's complement thereof for addition, and said first selection circuit selects and outputs the output value of said subtractor when the indication signal outputted from said comparison circuit indicates that the exponent value of the first operand is equal to or greater than the exponent value of said second operand.

5. The floating-point calculation apparatus according to claim 1, wherein said subtractor includes a conversion unit converting the exponent value of the second operand to a complement thereof, and an addition unit adding the exponent value of the first operand to an output value of said conversion unit, and said indication signal is a carryout signal outputted from a carry output of said addition unit.

6. The floating-point calculation apparatus according to claim 5, wherein said conversion unit of said subtractor converts the exponent value of the second operand to an 1's complement thereof, and said first selection circuit outputs and selects the output value from said subtractor when a carry output of said subtractor is logic "1".

7. The floating-point calculation apparatus according to claim 5, wherein said conversion unit of said subtractor converts the exponent value of said second operand to a 2's complement thereof, and said first selection circuit selects and outputs the output value from said subtractor when the indication signal from the carry output of said subtractor is logic "1".

8. The floating-point calculation apparatus according to claim 1, wherein said right-shift circuitry selectively right-shifts said output value from said second selection circuit by 1 bit for output in accordance with said indication signal.

9. The floating-point calculation apparatus according to claim 8, wherein said subtractor is an 1's complement subtractor, and said second selection circuit selects the fraction value of the second operand when said indication signal indicates that the exponent value of the first operand is greater than the exponent value of said second operand, and otherwise selects the fraction value of said first operand.

10. The floating-point calculation apparatus according to claim 9, wherein said compensating shift circuit right-shifts the output value from said second selection circuit by 1 bit for output when said indication signal indicates that the exponent value of said first operand is greater than the exponent value of said second operand.

11. The floating-point calculation apparatus according to claim 8, wherein said subtractor is a 2's complement subtractor, and said second selection circuit selects the fraction value of the second operand when the exponent value of the first operand is equal to or greater than the exponent value of said second operand, and otherwise selects the fraction value of the first operand.

12. The floating-point calculation apparatus according to claim 11, wherein said compensating shift circuit logically right-shifts the output value from said second selecting circuit by 1 bit for output when said indication signal indicates that the exponent value of said first operand is smaller the exponent value of said second operand.

13. The floating-point calculation apparatus according to claim 1, wherein said fraction value is represented by n bits, and said right-shift circuitry comprises a shift selection circuit selecting and outputting upper n bits of one of values respectively obtained by left-expanding and right-expanding the fraction values of said first and second operands by 1 bit and adding 0 in respective least and most significant bit positions, in accordance with said indication signal; and a second selection circuit selecting and outputting other of fraction values of said first and second operands in a manner complementary to the selection by said shift selection circuit, in accordance with said indication signal.

14. The floating-point calculation apparatus according to claim 13, wherein said subtractor is an 1's complement subtractor, and said shift selection circuit selects and outputs a value obtained by logic right-shifting of the fraction value of said second operand by 1 bit when said indication signal indicates that the exponent value of said first operand is greater than the exponent value of said second operand.

15. The floating-point calculation apparatus according to claim 1, wherein said fraction value is represented by n bits, and said right-shift circuitry comprises a shift selection circuit for selecting and outputting upper n bits of one of values respectively obtained by right-expanding and left-expanding fraction values of said first and second operands by 1 bit and adding 0 in respective most and least significant bit positions, in accordance with said indication signal.

16. The floating-point calculation apparatus according to claim 15, wherein said subtractor is a 2's complement subtractor, and said shift selection circuit selects and shifts a value obtained by logic right-shifting of fraction value of said first operand by 1 bit when said indication signal indicates that the exponent value of said first operand is smaller than the exponent value of said second operand.

17. A floating-point calculation apparatus for performing a calculation of operands in floating-point representation including an exponent value and a fraction value, comprising:
- a subtractor for subtracting exponent values of first and second operands;
- an inverting circuit for inverting an output value from said subtractor;
- a selection circuit for selecting one of said output value from said subtractor and an output value from said inverting circuit in accordance with an indication signal indicating which of the exponent values of said first and second operands is greater;
- right-shift circuitry for right-shifting a received value by one or more digits determined by an output value of said selection circuit; and
- a compensation circuit providing said right-shifter with a compensated value, which is a value right-shifted for one of said first and second operands, in accordance with the indication value.

* * * * *